United States Patent [19]

Fenton

[11] 4,025,372
[45] May 24, 1977

[54] METHOD OF MAKING A PADDED ITEM

[75] Inventor: Sidney Desmond Fenton, Preston, England

[73] Assignee: Storey Brothers & Company Limited, Lancaster, England

[22] Filed: Sept. 9, 1975

[21] Appl. No.: 611,741

Related U.S. Application Data

[63] Continuation-in-part of Ser. No. 437,090, Jan. 28, 1974, abandoned.

[30] Foreign Application Priority Data

Jan. 31, 1973  United Kingdom .............. 4931/73

[52] U.S. Cl. .................................. 156/79; 156/245; 156/229; 156/246; 264/45.6; 264/46.6; 264/321; 264/DIG. 78; 428/310; 428/315
[51] Int. Cl.² ............................................ B32B 5/20
[58] Field of Search .............. 264/45.5, 45.6, 46.6, 264/46.3, 321, DIG. 78; 156/79, 245, 246, 229; 428/311, 310, 315

[56] References Cited

UNITED STATES PATENTS

| | | | |
|---|---|---|---|
| 3,259,673 | 7/1966 | Ericson | 264/46.5 |
| 3,562,043 | 2/1971 | Eddy | 156/79 |
| 3,729,370 | 4/1973 | Cobbledick | 156/79 |
| 3,745,040 | 7/1973 | Morton et al. | 156/79 |

Primary Examiner—Edward G. Whitby
Attorney, Agent, or Firm—Pollock, Vande Sande & Priddy

[57] ABSTRACT

This invention relates to a method of making fabric-faced upholstered items. The items are made by vacuum forming under heat a laminate of a cast highly plasticized vinyl chloride homopolymer or copolymer sheet and a readily extensible fabric, and the resulting shaped cover is filled with a foam which is foamed in situ, the foam bonding to the thermoplastics sheet of the laminate and holding the laminate in shape. The laminate must have an extensibility in two directions at right angles of at least 25% under a load of 5 lb per 2 inch wide strip when subjected to loads of 5 lb applied at right angles to one another to the edges of a 2 inch side square of the fabric, and be capable of increasing its surface area by at least 50%. The fabric can have this high degree of extensibility and still be suitable as a cover because the laminate is bonded to the foam filling and so held to shape.

10 Claims, 2 Drawing Figures

METHOD OF MAKING A PADDED ITEM

CROSS REFERENCE TO RELATED APPLICATIONS

This application is a continuation-in-part of my earlier filed, co-pending U.S. patent application Ser. No. 437,090 filed Jan. 28, 1974 and abandoned subsequent to the filing of this application. The disclosure of this application is hereby incorporated by reference.

This invention relates to the manufacture of fabric faced upholstered resilient items such as vehicle seats, automobile interior trim and upholstered furniture parts.

BACKGROUND TO THE INVENTION

Shaped loose covers of plastics sheeting for such items can be prepared by shaping thermoplastics sheeting over a suitable mould and then the resilient item can be formed by positioning the resulting shaped loose cover over a resilient filling or by forming a foamable mixture in situ within the cover. To cover such items with a textile fabric has required shaping of the textile fabric by stitching together a number of flat pieces of the fabric since the lack of extensibility of such fabrics prevents their being given anything but the most trivial three-dimensional shape without producing wrinkles in the cover.

THE INVENTION

We have now found according to the invention that a laminate of a fabric which has a ready extensibility such that it will conform to shape under the loads imposed by vacuum forming and a vinyl chloride homopolymer or copolymer plastics sheet can be shaped by vacuum forming to give a fabric faced loose cover which can then be used as set out above to give the resilient item.

Therefore according to the invention there is provided a method of making a resilient fabric-faced upholstered item comprising the steps of:

a. shaping a laminate of a cast vinyl chloride homopolymer or copolymer sheet and a fabric by vacuum forming to the desired shape of a cover for the said item by heating the vinyl chloride homopolymer or copolymer sheet to a temperature of at least 150° C; said fabric being a knitted fabric having an extensibility in two directions at right angles of at least 25% under a load of 5lb per 2 inch wide strip and being capable of increasing its surface area by at least 50% when subjected to two loads of 5lb applied at right angles to one another to the edges of a 2 inch square of the fabric, and said case vinyl chloride homopolymer or copolymer sheet containing at least 35 parts of plasticizer per 100 parts of resin, b. holding said cover to shape in a mould with said fabric outermost and said cast vinyl chloride homopolymer or copolymer sheet innermost, c. placing within said cover the precursors of a resilient foam; and d. allowing said precursors to foam and fill said cover to provide a resilient foam filling said foam becoming bonded to said vinyl chloride homopolymer or copolymer sheet of said laminate cover and retaining said cover in the required shape of said upholstered item.

By following the invention we find even relatively deeply formed three-dimensionally shaped covers can be prepared from fabric laminate materials the cover having a fabric appearance, while the vinyl chloride polymer sheet maintains the fabric in its formed three-dimensional shape. Also the vinyl chloride polymer sheet makes the laminate impervious enabling it to be vacuum formed and filled with a foam prepared in situ without the foam penetrating the fabric and spoiling the appearance of the cover.

By the term "vacuum forming" we include the shaping of a laminate which has been softened by heating, both over and into a mould by forcing it over to into the mould by the application of a differential pressure across the laminate.

Fabric laminates such as required according to the invention have a markedly different extensibility from conventional upholstery fabrics and fabrics previously used in the construction of seat covers because such fabrics and in particular their type of weave, have previously been chosen so as to reduce their extensibility to the minimum possible, whereas the opposite is true of the fabrics used according to the invention.

The vinyl chloride polymer sheet is prepared by the well known method of casting. This involves spreading an uncured vinyl chloride polymer composition onto a temporary release sheet and passing the spread layer on the release sheet through a heated region to cure the composition. Upon cooling the resulting self-supporting vinyl chloride polymer sheet can be separated from the release sheet. If desired the latter can have pattern details on its surface which are transferred to the cast vinyl chloride polymer sheet.

The vinyl chloride polymer sheet must, according to the invention, be highly plasticized. This entails including in the composition 35 to 50 parts of plasticizer (such as a phthalate) per 100 parts of resin. By making the vinyl chloride polymer sheet highly plasticized the sheet is highly flexible and has a soft, full feel. This soft feel enables seats, for example, to be made which are much more comfortable and aesthetically pleasing. Sheets having such high plasticizer contents are not possible when vinyl chloride polymer sheets are made by calendering, because it is found that the act of calendering tends to squeeze out the plasticizer when relatively large amounts, e.g. about 30 to 33 parts per 100 parts by weight of resin, are present. Besides which, in the preparation of cast vinyl chloride polymer sheets, unlike calendered sheets, lubricant is not required.

The vinyl chloride polymer can a polyvinyl chloride or be copolymer of vinyl chloride with a copolymerizable monomer such as vinyl acetate or vinylidene chloride.

In order to prepare the shaped laminate, the vinyl chloride polymer sheet must be heated to at least 150° C and preferably 180° C, at which temperature it is sufficiently fluid, in fact almost liquid, to flow into, yet without penetrating completely through, the fabric to form an intimate laminate. If the sheet is not heated to such high temperatures of 150° C and above, as would be the case for conventional vacuum forming of a plain plasticized vinyl chloride polymer layer as made, for example, by calendering, there is a very marked tendency for the vinyl chloride polymer to contract significantly if the sheet becomes hot because of its so called "plastic memory". This is avoided in this invention because the fabric layer supports the vinyl chloride polymer layer when it is softened by heat. Therefore, one can use temperatures at which the vinyl chloride polymer sheet is more or less liquid, which destroys the "plastic memory". Additionally, it has been found during use in, for example, vacuum formed vinyl chloride polymer sheets as seat covers that these become subject to quite high temperatures. As a result they can soften appreciably and distort back to their original flat shape and there is a danger of wrinkles forming in the laminate which would of course severely detract from its appearance. This is markedly reduced in items according to the invention because of the very much higher temperature of vacuum forming which largely eliminates the "plastic memory" of the original flat sheet, and in addition the temperature of use is not as close to the forming temperature as with prior items vacuum formed at much lower temperatures. Further during shaping the very soft vinyl chloride polymer composition tends to flow into the fabric with the result that they key together and support one another against distortion during later use. This is a most important advantage of the invention when used, for instance, in the preparation of seats of a vehicle which is to be used in a hot climate. Further there is always some contraction after vacuum forming when a shaped sheet is removed from the mould. This contraction is very much reduced according to the invention when the shaping has been made at higher temperatures. Accordingly a more accurately shaped cover can be made according to the invention.

The plasticizers that are used are preferably dioctylphthalate or dioctyl sebacate but phosphates such as tricresyl phosphate can also be used.

In order to spread the stretching which occurs locally during vacuum forming, one can adopt the well known expedients of "bubble blowing" and "plug assist" to avoid certain areas, such as edges or sharp corners, being thinned too much during forming. However, we have found that when fabric laminates are vacuum formed problems of thinning at the edges of the resulting cover are much reduced as compared to vacuum forming thermoplastics sheeting. This appears to be because it is much easier for a fabric surface to slip or slide over a mould surface than for a plastics surface and so when the fabric laminate is vacuum formed, particularly in a female mould, stretching occurs fairly evenly over the whole area of the laminate and not locally as with thermoplastics sheeting.

The vinyl chloride polymer sheet need not be particularly thick, e.g. from 20 to 2000 microns in thickness. Its thickness can be chosen to ensure that, once the laminate has been formed, it will hold the laminate in its formed shape. Also since the cover is to be filled with foam formed within the cover, the polymer sheet must be thick enough to withstand the pressures of the foaming step without allowing the foam to penetrate through the fabric so spoiling its appearance and stiffening the fabric. The vinyl chloride polymer sheet can be, for example, a plasticized vinyl chloride polymer sheet, a layer of a foamed vinyl chloride polymer or the laminate of non-blown layer and a blown foamed layer. It is preferred that the sheet be a layer of a foamed vinyl chloride polymer. Such layers can be made in known manner by casting a non-cured composition containing a blowing agent such as azodicarbonamide which becomes effected when the composition is heated to air it. The foamed layer should preferably contain closed cells. Examples of suitable polymer sheets are a non-blown sheet 24 thousanths thick and weighing 24 oz/square yard and a foamed sheet 70 thousanths thick and weight 20 oz/square yard.

The fabric needs a ready extensibility which allows it to stretch to the shape required because the vacuum forming shaping force is relatively small. Thus, when shaping a ready extensibility of at least about 25% in two directions at right angles to one another under a load of 5 lb per 2 inch wide strip of material. Preferably the extension is at least 35%, in two directions at right angles under the vacuum forming loads. In addition the surface area of the fabric should increase by at least 50% and preferably 100%, when a 2 inch square is subjected to two 5 lb loads applied at right angles to one another at the edges of the square.

It appears that the loads provided during a vacuum forming operation are of the order of 5 lb per 2 inch wide strip of material. Therefore the ready extensibilities noted above should be those which occur under such loads.

The extensibility of any particular fabric can be readily measured on conventional mechanical testing apparatus to see if it is suitable.

The fabric used to obtain this ready extensibility is a knitted fabric and preferably a weft knitted fabric as a warp knitted fabric tends to have more dimensional stability and consequently is not always suitable. An example of a knitted fabric which is eminently suitable for the present invention is a single jersey weighing between 4.5 and 6.9 oz/sq yd. Also a combination of a knitted fabric and a highly crimped yarn such as nylon 66, having a crimp rigidity of 45%, can be used. Knitted fabrics obtain their extensibility from the way in which they are woven i.e. weft as opposed to warp weaving. This extensibility can be enhanced by the choice of yarn. Thus one can use yarns which are highly crimped or are coiled e.g. Nylon 6 or 66 yarns or coiled yarns.

One preferred fabric is a loop knitted fabric, the raised loops facing outwardly of the laminate and giving the shaped cover a comfortable velvet-like feel and appearance. A similar feel and appearance can be given by a brushed knitted fabric. The loops or pile also mask any distortion of the fabric which has occured during stretching to conform to shape of the cover. For the same reason the fabric has preferably a plain coloured and textured appearance.

Once the cover has been prepared by vacuum forming the laminate to shape, it is given a resilient filling. This is achieved by holding to shape, e.g. by sucking the cover into a female mould to hold it to shape, and it is then filled with a plastics foam by forming that foam in situ, e.g. from a polyurethane foam forming mixture. Preferably the foam has a density of from 40 to 56 kg/m³. Once the foam has formed, the cover and the integral foam filling can then be removed from the mould to give the desired resilient item. Because the shaped fabric laminate cover has a foam filling formed in situ it is intimately bonded to the filling and so the filling holds the cover to shape even though the fabric of the cover is readily extensible.

The invention is particularly applicable to the formation of back rests and cushions of car seats although upholstered items generally and interior trim parts and panels for vehicles can also be formed according to the invention.

BRIEF DESCRIPTION OF THE DRAWINGS

The invention will now be described, by way of example, with reference to the accompanying drawings, in which.

DESCRIPTION OF THE PREFERRED EMBODIMENT

Figure 1:
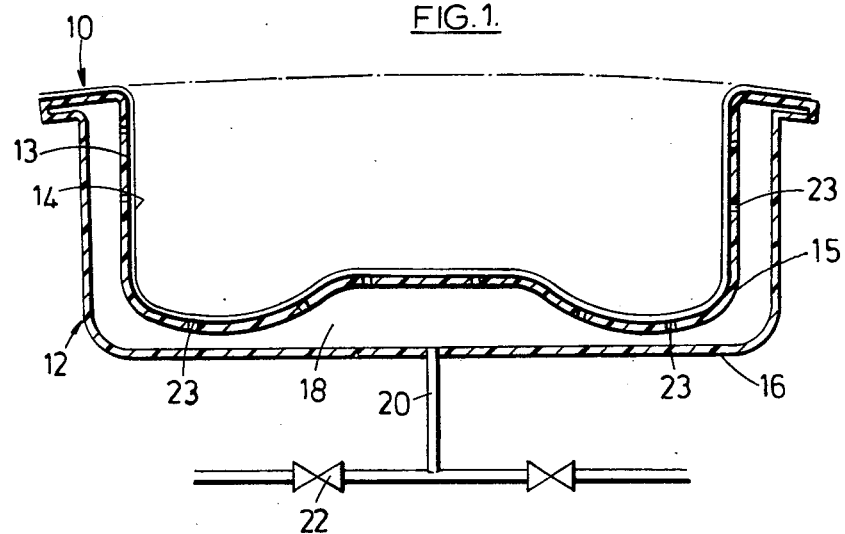
FIG. 1 is a cross-section through a female shaping mould showing the vacuum forming of the laminate of fabric and thermoplastics sheet.
Figure 2:
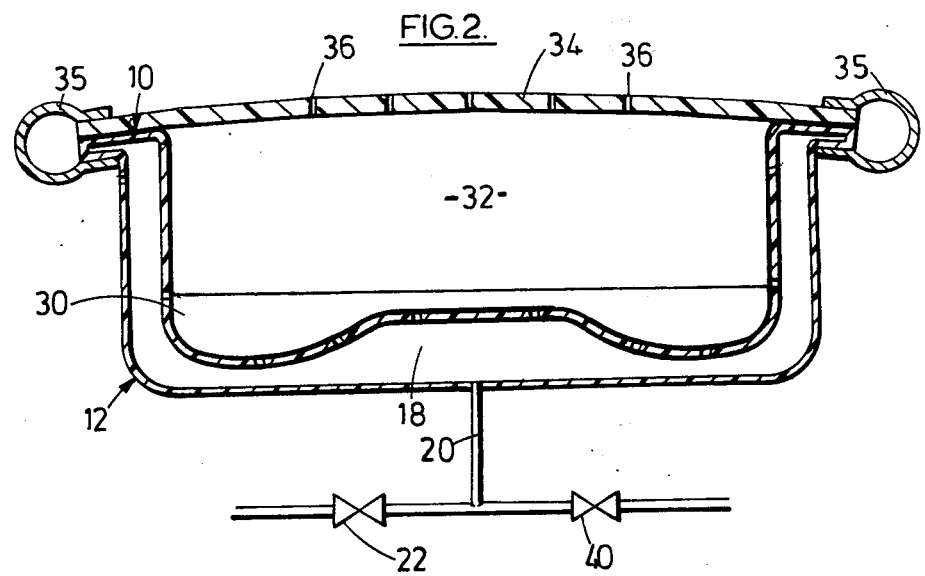
FIG. 2 is a cross-section through the female mould showing the filling of the cover with foam.

The fabric laminate 10 used in the preparation of a resilient item in the mould 12 shown in FIGS. 1 and 2 is the laminate of a knitted nylon fabric 13 and a solid sheet 14 of plasticized polyvinyl chloride.

The fabric is a weft knitted single jersey plush fabric weighing 6.9 oz/square yard and having 25 wales per inch (w.p.i.) and 29 coarses per inch (c.p.i.). It is knitted form 2/7/20 denier nylon (66) yarn on the back and has a 2/70/20 denier nylon (66) yarn trilobal chenille plush face. The fabric is knitted in an 18 gauge 26 inch diameter single jersey plush knitting machine.

The sheet 14 has been formed by casting an uncured polyvinyl chloride composition followed by heating the composition to cure it, and the fabric 13 and the sheet 14 have been joined by the application of a laminating paste to the polyvinyl chloride.

The polyvinyl chloride sheet contains 100 parts of BREON P130/1 polyvinyl chloride, 98 parts diaphanolphthalate (dap.), 1.4 parts of LANKRO Mark M stabilizer, 0.7 parts of LANKRO Mark PL stabilizer, 2.7 parts of LANKRO FLEX ED6 stabilizer, and 10 parts of color paste (2 parts pigment to 1 part diaphanolphthalate).

The laminating paste contains 100 parts of GEON 135 polyvinyl chloride, 45 parts of diaphanolphtalte, 9 parts of diisooctyladipate, 3.3. parts of LANKRO Mark M stabilizer, 1.1 parts of LANKRO FLEX Mark PL stabilizer and 27 parts of color paste (2 parts pigment to 1 part diaphanolphthalate).

The laminate is first vacuum formed by heating the polyvinyl chloride about 180° C and then sucking the softened laminate down into the female mould 12 or over a male mould (not shown). In the latter case the resulting shaped loose cover is transferred to the mould 12 and held in position in it by the vacuum.

As shown in FIG. 1 the mould has a moulding surface 15, an outer box 16 and between these is a vacuum chamber 18. A vacuum is maintained in this chamber 18 through a line 20 and valve 22 to a vacuum pump (not shown). Through the moulding surface 15 are a number of fine holes 23 and so when a sheet of the laminate 10 (shown in broken lines) is placed over the top of the mould 12, it is sucked down and caused to conform to the shape of the mould surface 15, as shown in FIG. 1.

While it is held by the vacuum in this shape, the resulting shaped cover is given a resilient foam filling.

Thus as shown in FIG. 2, the liquid precursors of a polyurethane foam 30 are poured into the interior 32 of the cover, a lid 34 is clamped by clamps 35 over the cover, the lid having vent holes 36 and the precursors left to react and foam up and fill the cover. During foaming, the foam will adhere to the foam 14 both chemically and mechanically giving a firm bond.

After the foaming reaction, the completed item can be ejected from the mould to give the required resilient item, the foam filling maintaining the required shape of the shaped laminate cover because of the bond between the foam and laminate. To assist in removal of the item from the mould 12, the valve 22 can be closed and instead pressurized air admitted through a valve 40 to the chamber 18.

Instead of using a solid sheet of polyvinyl chloride a foamed sheet can be used. In this case a foaming agent is included in the uncured polyvinyl chloride which foaming agent produces foaming when the polyvinyl chloride is heated during the curing process.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What is claimed is:

1. A method of making a resilient fabric-faced upholstered item comprising the steps of:
  a. shaping a laminate of a cast plasticized vinyl chloride homopolymer or copolymer sheet and a fabric by vacuum forming to the desired shape of a cover for said item by heating said vinyl chloride homopolymer or copolymer sheet to a temperature of at least 150° C, said fabric being a knitted fabric having an extensibility in two directions at right angles of at least 25% under a load of 5 lb per 2 inch wide strip and being capable of increasing its surface area by at least 50% when subjected to two loads of 5 lb applied at right angles to one another to the edges of a 2 inch square of said fabric, and said vinyl chloride homopolymer or copolymer sheet containing at least 35 parts of plasticizer per 100 parts of polymer;
  b. holding said cover to shape in a mould with said fabric outermost and said cast vinyl chloride homopolymer or copolymer sheet innermost;
  c. placing within said cover the precursors of a resilient foam; and
  d. allowing said precursors to foam and fill said cover to provide a resilient foam filling, said foam becoming bonded to said vinyl chloride homopolymer or copolymer sheet of said laminate cover and retaining said cover in the required shape of said upholstered item.

2. A method according to claim 1 in which said resilient foam is a polyurethane foam.

3. A method according to claim 1 in which the said vinyl chloride homopolymer or copolymer sheet contains 35 to 50 parts of plasticizer per 100 parts of polymer.

4. A method according to claim 1 in which said vinyl chloride homopolymer or copolymer sheet is heated to 180° C.

5. The method of claim 1 wherein said polymer sheet is from 20 to 2,000 microns in thickness.

6. The method of claim 1 wherein said foam contains closed cells.

7. The method of claim 1 wherein said extensibility is at least 35%.

8. The method of claim 1 wherein said fabric is capable of increasing its surface area by at least 100%.

9. The method of claim 1 wherein said fabric is a loop knitted fabric.

10. The method of claim 1 wherein the foam has a density of from 40 to 56 kg/m$^3$.